United States Patent [19]
Herbst et al.

[11] Patent Number: 5,378,440
[45] Date of Patent: Jan. 3, 1995

[54] METHOD FOR SEPARATION OF SUBSTANCES

[75] Inventors: Joseph A. Herbst, Turnersville, N.J.; Charles T. Kresge, West Chester, Pa.; David H. Olson; Kirk D. Schmitt, both of Pennington, N.J.; James C. Vartuli, West Chester, Pa.; Daniel I. C. Wang, Belmont, Mass.

[73] Assignee: Mobil Oil Corp., Fairfax, Va.

[21] Appl. No.: 16,402

[22] Filed: Feb. 11, 1993

Related U.S. Application Data

[63] Continuation-in-part of Ser. No. 918,322, Jul. 22, 1992, Pat. No. 5,220,101, which is a continuation-in-part of Ser. No. 718,056, Jun. 20, 1992, Pat. No. 5,145,816, which is a continuation-in-part of Ser. No. 625,245, Dec. 10, 1990, Pat. No. 5,098,684, which is a continuation-in-part of Ser. No. 470,008, Jan. 25, 1990, Pat. No. 5,102,643, said Ser. No. 718,056, is a continuation-in-part of Ser. No. 625,171, Dec. 10, 1990, Pat. No. 5,057,296.

[51] Int. Cl.$^6$ ............................................. B01D 53/04
[52] U.S. Cl. .................................... 423/210; 585/820; 210/500.21; 210/500.25; 210/660; 210/679; 502/407; 502/415; 95/45; 95/88; 96/4; 96/101
[58] Field of Search ............... 585/820; 210/500.25, 210/500.21, 660, 679; 55/75, 386; 423/210; 502/407, 415

[56] References Cited

U.S. PATENT DOCUMENTS

| | | |
|---|---|---|
| 3,266,973 | 8/1966 | Crowley . |
| 3,725,302 | 4/1973 | Shimely et al. ................... 252/430 |
| 4,091,079 | 5/1978 | Vaughan .............................. 423/328 |
| 4,257,916 | 3/1981 | Hancock et al. ................... 252/430 |
| 4,390,414 | 6/1983 | Cody .................................... 208/111 |
| 4,439,409 | 3/1984 | Puppe et al. ....................... 423/328 |
| 4,771,029 | 9/1988 | Pereira et al. ..................... 502/355 |
| 4,954,325 | 9/1990 | Rubin et al. ......................... 502/64 |
| 5,019,263 | 5/1991 | Haag et al. ..................... 210/500.25 |
| 5,091,433 | 2/1992 | Wulff et al. ........................... 521/54 |
| 5,104,546 | 4/1992 | Filson et al. ....................... 210/650 |
| 5,139,760 | 8/1992 | Ogawa et al. ...................... 502/263 |
| 5,145,816 | 9/1992 | Beck et al. ............................ 502/60 |
| 5,198,203 | 3/1993 | Kresge et al. ...................... 423/718 |
| 5,220,101 | 6/1993 | Beck et al. .......................... 585/820 |
| 5,236,683 | 8/1993 | Nakazawa et al. ..................... 502/8 |

FOREIGN PATENT DOCUMENTS

63-230516 9/1988 Japan .

OTHER PUBLICATIONS

Tsikoyiannis et al., "Synthesis and Characterization of a Pure Zeolitic Membrane," Zeolites 12, 126–130 (1992).
Lachman et al., "Extruded Monolithic Catalyst Supports," Symposium on Catalyst Supports: Chemistry, Forming and Characteristics Presented before the Division of Petroleum Chemistry, Inc. American Chemical Society, 535–543 (1991).
J. M. Rojo, et al., "Si MAS–NMR Spectra of Lamellar Silicic Acid H–magadiite and its Trimethylsilyl Derivative", Z. Anorg. Allg. Chem. 540/541, 227–233 (1986).
W. E. Rudzinski, et al., "Synthesis, Solid–State Nuclear Magnetic Resonance Characterization and Chromatographic Evaluation of a Diphenylphosphine–Octadecylsilane Hybrid Bonded Phase," Journal of Chromatography 323, 281–296 (1985).
C. A. Fyfe, et al., "Quantitatively Reliable Silicon–29 Magic–Angle Spinning Nuclear Magnetic Resonance Spectra of Surfaces and Surface–Immobilized Species at High Field Using a Conventional High–Resolution Spectrometer," J. Phys. Chem. 89, 277–281 (1985).

(List continued on next page.)

Primary Examiner—Anthony McFarlane
Attorney, Agent, or Firm—Alexander J. McKillop; Malcolm D. Keen; Dennis P. Santini

[57] ABSTRACT

Methods for separation of substances are provided. The methods include contacting a mixture of at least two components in flowable conditions with mesoporous, crystalline materials termed M41S which also include MCM-41 materials. The mesoporous crystalline materials may be used in separations as is or functionalized.

53 Claims, No Drawings

OTHER PUBLICATIONS

D. W. Sindorf, et al., "Silicon-29 Nuclear Magnetic Resonance Study of Hydroxyl Sites on Dehydrated Silice Gel Surfaces, Using Silylation as a Probe," J. Phys. Chem. 87, 5516–5521 (1983).

D. W. Sindorf, et al., "Cross-Polarization/Magic-Angle Spinning Silicon-29 Nuclear Magnetic Resonance Study of Silica Gel Using Trimethylsilane Bonding as a Probe of Surface Geometry and Reactivity," J. Phys. Chem. 86, 5208–5219 (1982).

H. Colin, et al., "Introduction to Reversed-Phase High Performance Liquid Chromatography," Journal of Chromatography 141, 289–312 (1977).

J. B. Peri et al., "The Surface Structure of Silica Gel," J. Phys. Chem. 72, 2926–2933 (1968).

Tsikoyiannis et al., "Synthesis and Characterization of a Pure Zeolitic Membrane," Zeolites 2, 126–130 (1992).

Lachman et al., "Extruded Monolithic Catalyst Supports," Symposium on Catalyst Supports: Chemistry, Forming and Characteristics Presented before the Division of Petroleum Chemistry, Inc. American Chemical Society, 535–543 (1991).

Norman N. Li, "Membrane Processes," *Perry's Chemical Engineers' Handbook*, Sixth Edition, 17–18–17–22 (1984).

Israel Cabasso, "Hollow-Fiber Membranes," *Kirk-Othmer Concise Encyclopedia of Chemical Technology*, Third Edition, 598–599 (1984).

Martin H. Stryker, Alan A. Weldman, "Blood Fractionation," *Kirk-Othmer Concise Encyclopedia of Chemical Technology*, Third edition, 174–175 (1984).

Edward F. Leonard, "Dialysis," Kirk-Othmer Concise Encyclopedia of Chemical Technology, Third Edition, 349–350 (1984).

P. R. Klinkowski, "Ultrafiltration," *Kirk-Othmer Concise Encylopedia of Chemical Technology, Third Edition, 1203–1204 (1984).*

Anthony R. Cooper, Julian F. Johnson, "Gel Permeation Chromatography," *McGraw-Hill Encyclopedia of Science and Technology*, 6th Edition, vol. 7, 608–610 (1987).

George H. Morrison, "Chemical Separation Techniques," *McGraw-Hill Encyclopedia of Science and Technology*, 6th Edition, vol. 3, 492–493 (1987).

Bruce Frank, "Insulin," *McGraw-Hill Encyclopedia of Science and Technology*, 6th Edition, vol. 9, 236–240 (1987).

H. F. Walton, "Ion Exchange," *McGraw-Hill Encyclopedia of Science nad Technology*, 6th Edition, vol. 9, 353–357 (1987).

Milos V. Novotny, "Chromatography," *McGraw-Hill Encyclopedia of Science and Technology*, 6th Edition, vol. 3, 568–574 (1987).

Barry L. Karger, "Liquid Chromatography," *McGraw-Hill Encyclopedia of Science and Technology, 6th Edition, vol. 10, 107–109 (1987).*

Branton, et al., "Physisorption of Nitrogen and Oxygen by MCM-41, a Model Mesoporous Adsorbent", *J. Chem. Soc. Chem. Com. Commun.*, 1257–1258 (1993).

Franks, et al., "Unusual Type of Adsorption Isotherm Describing Capillary Condensation without Hysteresis", *J. Chem. Soc. Chem. Commun.*, 724–725 (1993).

METHOD FOR SEPARATION OF SUBSTANCES

CROSS REFERENCE TO RELATED APPLICATIONS

This application is a continuation-in-part of U.S. patent application Ser. No. 07/918,322, filed on Jul. 22, 1992 now U.S. Pat. No. 5,220,101, which is a continuation-in-part of U.S. patent application Ser. No. 07/718,056, filed Jun. 20, 1992, now U.S. Pat. No. 5,145,816, which is a continuation-in-part of U.S. patent application Ser. No. 07/625,245 filed Dec. 10, 1990, now U.S. Pat. No. 5,098,684, which is a continuation-in-part of application Ser. No. 07/470,008, filed Jan. 25, 1990, now U.S. Pat. No. 5,102,643. Application Ser. No. 07/718,056 is also a continuation-in-part of U.S. patent application Ser. No. 07/625,171, filed Dec. 10, 1990, now U.S. Pat. No. 5,057,296.

BACKGROUND OF THE INVENTION

This invention relates to separation methods which employ solid inorganic porous materials. More particularly, the present invention relates to novel synthetic ultra-large pore crystalline material useful for separating component substances within a mixture as well as methods relating thereto.

Porous inorganic solids have great utility as catalysts and separation media for industrial applications. Catalytic and sorptive activity are enhanced by the extensive surface area provided by a readily accessible microstructure characteristic of these solids.

The porous materials in use today can be sorted into three broad categories using the details of their microstructure as a basis for classification. These categories are 1) amorphous and paracrystalline supports, 2) crystalline molecular sieves and 3) modified layered materials.

Variations in the microstructures of these materials manifest themselves as important differences in the catalytic and sorptive behavior of the materials, as well as differences in various observable properties used to characterize them. For example, surface area, pore size and variability in pore sizes, the presence or absence of X-ray diffraction patterns, as well as the details in such patterns, and the appearance of the materials when their microstructure is studied by transmission electron microscopy and electron diffraction methods can be used to characterize porous inorganic solids.

Amorphous and paracrystalline materials represent an important class of porous inorganic solids which have been used for many years in industrial applications. Typical examples of these materials are the amorphous silicas commonly used in catalyst formulations and the paracrystalline transitional aluminas used as solid acid catalysts and petroleum reforming catalyst supports.

The amorphous materials are generally characterized as "amorphous" since they are substances having no long range order. Unfortunately, this can be somewhat misleading since almost all materials are ordered to some degree, at least on the local scale. An alternate term which has been used to described these materials is "X-ray indifferent". The microstructure of the silicas consists of 100–250 Å particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pore sizes tend to be distributed over a rather large range. This lack of order also manifests itself in the X-ray diffraction pattern, which is usually featureless.

Paracrystalline materials such as the transitional aluminas also have a wide distribution of pore sizes, but exhibit better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987).

Despite any differences arising between these paracrystalline or amorphous materials, neither substance has long range order controlling the sizes of pores in the material. Consequently, variability in pore size is typically quite high. The sizes of pores in these materials fall into what is known in the art as the "mesoporous range", which, for the purposes of this Application, is from about 13 to 200 Å.

In sharp contrast to these structurally ill-defined solids are materials whose pore size distribution is narrow because it is controlled by the precisely repeating crystalline nature of the materials' microstructure. These materials are referred to as "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction. These crystalline structures contain a large number of smaller cavities which may be interconnected by a number of still smaller channels or pores. These cavities and pores are uniform in size within a specific zeolitic material. Since the dimensions of these pores provide access to molecules of certain dimensions while rejecting those of larger dimensions, these materials are known as "molecular sieves". These molecular sieves have been utilized in a variety of ways in order to take advantage of their properties.

Molecular sieves, both natural and synthetic, include a wide variety of positive ion-containing crystalline silicates. These silicates can be described as a rigid three-dimensional framework of $SiO_4$ and Group IIIB element oxides, e.g. $AlO_4$, in which the tetrahedra are cross-linked by the sharing of oxygen atoms. The ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion of a cation in the crystal. Examples of such cations include alkali metal or alkaline earth metal cations. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, with ratios from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up, as measured within the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicates of varying alumina and metal content.

Additionally, aluminum phosphates are taught in the U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, *Memoir Presented to the Chemical Society*, No. 392, "Study of Aluminum Phosphate and Trivalent Iron", Jul. 6, 1961 (received), pp. 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher and exhibiting an X-ray diffraction pattern consistent with a material having pore windows formed by 18 tetrahedral members of about 12–13 Å in diameter are taught in U.S. Pat. No. 4,880,611.

A naturally occurring, highly hydrated basic ferric oxyphosphate mineral, cacoxenite, is reported by Moore and Shen, Nature, Vol. 306, No. 5941, pp. 356-358 (1983) to have a framework structure containing very large channels with a calculated free pore diameter of 14.2 Å. R. Szostak et al., *Zeolites: Facts, Figures, Future*, Elsevier Science Publishers B.V., 1989, present work showing cacoxenite as being very hydrophilic, i.e. adsorbing non-polar hydrocarbons, only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e., silicoaluminophosphates of particular structures are taught in U.S. Pat. Nos. 3,355,246 (i.e. ZK-21) and 3,791,964 (i.e., ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227. An antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Å, with the largest reported being about 12 Å.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Indeed, X-ray diffraction patterns have come to play an important role in identification of various crystalline materials, especially pillared layered materials. Nevertheless, it is the physical properties of these materials which render them valuable assets to the scientific and industrial communities. These materials are not only valuable when employed in the petroleum industry, but they have also been found to exhibit properties useful for a variety of applications including such fields as nonlinear optics and the biological and chemical sciences.

One particular area of interest involves employing these porous crystalline materials in the fields of chemistry and biology in order to effect the separation of substances contained within a mixture. Generally, separations encompass a vast number of apparatus and techniques; however, they can be broadly classified into several categories, namely: extractions, distillations, centrifugations, precipitations, filtrations, clarifications, membrane separations and chromatography.

Despite the vast range in apparatus and techniques, all separations involve the need for two phases of matter. For example, extractions generally involve two immiscible liquid phases, typically an aqueous and an organic phase, wherein a solute migrates out of one phase and into the other based upon its relative solubility between the two phases. In contrast, chromatography generally involves a fluid mobile phase which is contacted with a fixed stationary phase.

In chromatography, the mobile phase is typically a gas or a liquid which contains a sample to be separated or purified. The mixture generally contains several components which are to be isolated from one another based upon some physical property of the substances, such as molecular weight, binding polarity or the like. Additionally, all chromatography methods operate to isolate a particular substance based upon a retention of that substance by the stationary phase or, alternatively, by the relative tendencies of different substances to partition into the stationary phase and become associated therein.

There are various types of chromatography, including ion exchange, reverse phase, partition, affinity, elution, column, adsorption, flat-bed, batch, thin layer, paper, gel permeation and other size exclusion-based chromatography as well as gas, liquid and solid chromatography. Generally, the nomenclature for the different types of chromatography is based upon either the type of mobile phase employed, the nature of the stationary phase, the nature of the interaction between the stationary phase and the substance retained by it or the type of technique or apparatus used in the chromatographic system. For example, gas and liquid chromatography are named for the type of mobile phase employed. Ion exchange, affinity, partition, adsorption and size exclusion chromatography are named due to the nature of the interaction between the stationary phase and the substance retained by it. Elution, reverse phase, column, flat-bed, batch, thin layer and paper chromatography are named based upon the type of technique or apparatus employed.

As previously mentioned, some other separations include filtration, clarification and membrane separations, all of which are important in the fields of chemistry and biology. Membrane separations are processes for the separation of mixtures using thin barriers or membranes positioned between two miscible fluids. Typically, concentration or pressure differentials provide a suitable driving force across the membrane for promoting separation of one or more components in the mixture.

Generally, membrane separations may be sub-divided into the categories of ultrafiltration, dialysis, electrodialysis, reverse osmosis, gas or liquid diffusions and facilitated transport mechanisms driven by chemical reactions. Filtration involves the separation of solid particles from a fluid-solid suspension in which they are contained. The separation is generally performed by a filter medium having a predetermined pore size. Clarification involves the removal of extremely fine, particulate solids from liquids.

Although clarification can be thought of as an ultrafine filtration in the sense that solid particulates are removed from a liquid, the technique is different from filtration in that clarification employs a different set of separation mechanics including gravity sedimentation, centrifugal sedimentation, magnetic separation and similar mechanical separation techniques which usually do not involve a filter. Other major separation techniques include distillation, extraction and precipitations.

Regardless of the type of separation or the specific parameters associated with it, all separations can be grouped into two categories, those which employ solids either as a separation means or as a support mechanism for the separation means and those which employ no such solids. For example, extractions usually do not employ solids for the separation but rather rely upon the relative solubility of a particular solute in two immiscible liquid phases. In contrast, most chromatography-based separations employ a solid in some form, either as a support mechanism or a separation means or both. Alternatively, distillations and precipitations may employ solids but these are typically utilized either as inert condensation supports or crystal seeding mechanisms, respectively.

In liquid-liquid chromatography, for example, one liquid functions as the mobile phase while the other operates as the stationary phase. The liquid stationary phase is typically supported by affixing it to a solid substrate, either by physisorption or chemisorption. The separation occurs via the relative tendency of certain components present in the liquid mobile phase to partition into the liquid stationary phase based upon some physical characteristic, such as polarity or solubility. This form of chromatography is also commonly referred to as partition-based chromatography since it is based upon the tendency of a sample to partition into one phase more readily than other components in a mixture.

Alternatively, most affinity-based chromatography techniques employ a stationary phase which involves a solid separating agent supported by an inert solid support means. Typically, an inert solid having a high surface area is coated with a substance, such as a particular protein, which has a specific binding affinity for a substance which is to be isolated. In such a system the solid protein-based separating agent performs the separation.

Other types of chromatography systems employ solids which function as separating agents as well as support mechanisms. For example, certain types of adsorption-based chromatography systems employ porous solid materials to perform a size exclusion-based separation while simultaneously providing a support to which a secondary separating agent is attached. The secondary separating agent is typically some reactive molecule or a functional chemical moiety that performs a separation based upon its interaction with a particular component in a mixture.

Additionally, other separation techniques may employ solids in the manner discussed above. For example, membrane separations often employ solid porous materials which have been deposited or coated onto an inorganic substrate in order to produce a thin layer membrane employed as a separating agent. Similar approaches are used for constructing filters used in filtration and clarification procedures.

In light of the various separations which employ solids, such as those discussed above, there exists an ongoing need to develop new and useful separation techniques as well as the need to provide vehicles for improving the efficiency of existing separation technologies. As previously mentioned, a variety of porous inorganic solids, such as zeolites as well as other related types of molecular sieves, have been applied in wide range of technologies due to their unique physical properties. In particular, these materials have been employed in separation techniques, mostly in the area of industrial gas separations, since the porous nature of their microstructure allows entering molecules access to an extensive surface area. This increased surface area enhances the utility of these materials with respect to their catalytic and sorptive activities.

Unfortunately, many of these materials have some inherent variation in pore size which tends to undermine the integrity of separations in which they are employed, especially when these materials are involved in size exclusion-based separation techniques. Moreover, most currently available molecular sieves have a relatively small pore size. As there is no way of tailoring the pore sizes of such sieves, the artisan is forced to choose between different sieves, depending upon the desired pore size. This is often undesirable since utilizing different sieves may invariably invoke unpredictable results in the procedure in which the sieve is employed.

Additionally, many currently available sieves do not readily accept the attachment of functional groups to their pore walls, thereby limiting the range of separation applications in which they may be employed. Furthermore, many of the large pore molecular sieve materials which are currently available lack thermal stability and often behave unpredictably in response to changes in pH.

It is therefore an object of the present invention to provide a new method for separating substances using a unique, large pore crystalline phase material which is thermally stable under a range of pH while exhibiting a high degree of uniformity in pore size.

It is further an object of the present invention to provide a new method for separating substances using a unique, large pore crystalline phase material which has pore walls that can be functionalized to include various reactive chemical moieties, as well as affording a high degree of control for the artisan attempting to modify the material in order to provide a pre-determined pore size.

SUMMARY OF THE INVENTION

The present invention is a separation method involving the use of a new class of molecular sieves which can be employed to perform the separation of component substances contained within a mixture. In particular, the method of the present invention includes the steps of contacting a mixture including at least a first and a second component in a flowable condition with an inorganic, porous, non-layered crystalline phase material. The material can be readily identified because it exhibits, after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C. The material is typically fixed in a stationary condition for contact with the mixture. The contact should occur over a sufficient time and under conditions suitable for inducing a retention of the first component within the pores of the material so that the first component becomes separated from the second component.

The method of the present invention further provides for the modification of the molecular sieve material by incorporating a separating agent supported upon the pore walls of the material. The separating agent may either be a liquid or a gas which has been adsorbed on the pore walls, or, alternatively, some substance which is chemically coupled to the walls. In particular, the separating agent is typically some substance which undergoes a retentive association with at least one of the components in a mixture to be separated, thereby invoking a separation of at least one of the components from at least one other component present in the mixture. In situations where the separating agent is chemically coupled to the pore walls, it will usually be present in solid form as a variation of some functional group or specialized moiety.

The pore walls of the molecular sieve material may be functionalized by contacting the material with a treatment composition. In particular, the treatment composition comprises $M'X'Y'_n$ wherein:

$M'$ is selected from a group consisting of Periodic Table Groups IIA, IIIA, IVA, VA, VIA, VIIIA, IB, IIB, IIIB, IVB, VB and VIB;

$X'$ is selected from a group consisting of halides, hydrides, alkoxides of $C_{1-6}$, alkyls of $C_{1-18}$, alkenyls of $C_{1-18}$, aryls of $C_{1-18}$, aryloxides of $C_{1-18}$, sulfonates, nitrates, and acetates;

$Y'$ is selected from a group consisting of $X'$, amines, phosphines, sulfides, carbonyls and cyanos; and $n = 1-5$.

The contacting step should be performed for a sufficient time and under suitable conditions so that the pore walls of the crystalline phase material become functionalized. The functionalization typically operates to impart a predetermined set of sorptive characteristics to the material. Consequently, upon contact with a mixture to be separated, the first component becomes sorbed and retained by the functionalized walls, thereby providing a separation of the first component from the second component. Alternatively, the functional group attached by the method mentioned above may serve to couple a specialized moiety to the pore wall in order to impart further separation selectivity to the material.

The resulting material may be used either in its "synthesized" or modified forms in a variety of separation techniques, including various types of chromatography. Additionally, the material may be employed in other separation technologies, especially membrane-based separation techniques. Some of these techniques include filtrations, clarifications, membrane reactions and other membrane-related separations, such as ultrafiltration, dialysis, electrodialysis, reverse osmosis, gas or liquid diffusions and facilitated transport mechanisms. Accordingly, the present invention is also directed to the resulting separation-performing substances produced by the method of the present invention.

Generally, such methods involve contacting a feedstream mixture including at least a first component at a first concentration and a second component at a second concentration witch a separation membrane comprising the molecular sieve material of the present invention. In particular, the contacting step should occur under separation conditions such that the microstructure of the material affords a greater permeability of the first component through the membrane than the second component. The resulting effluent stream produced by the method is characterized by a substantial reduction in the concentration of the second component.

The method of the present invention is particularly advantageous for separating component substances contained within a mixture due to the unique properties of the molecular sieve material incorporated therein. In particular, the molecular sieve material employed in the method of the present invention contains a highly unique mesopore system having a high surface area and large sorption capacity.

Generally, currently available ultra-large pore sieve materials exhibit undesirable variations in pore size and shape. Additionally, the pore size and shape are difficult to control under existing synthesis protocols. These variations in microstructure render existing molecular sieve materials relatively inefficient for many types of chemical and biological separations.

Quite differently, the molecular sieve material employed in the method of the present invention may be synthesized with an unusually high degree of regularity in pore size and shape. Additionally, the material is highly controllable with respect to pore size and shape, thereby providing the artisan with a reliable approach for tailoring the pores to perform a variety of highly sensitive separations which cannot be effectively carried out using other currently available large pore molecular sieve materials.

Additionally, the method of the present invention is particularly advantageous in that the material incorporated in the method allows for a unique functionalization of the pore walls, wherein specific functional groups and/or specialized moieties may be attached to tailor the material for individual separation technologies. Heretofore, the application of large pore molecular sieve materials was quite limited due to the inability to attach these special separating agents. The method of the present invention overcomes this problem and can be applied in a wide variety of chemical and biological separations.

The method of the present invention is also particularly advantageous in size exclusion separations. For example, most size exclusion-based chromatography involves synthetic organic polymers or semi-rigid organic gels which are typically packed into a column. The material used in the method of the present invention is much easier to pack into columns, resulting in separation assemblies that are mechanically stable over extended periods of time and under various processing conditions. Furthermore, separation assemblies employing the material of the present invention exhibit greater throughputs without loss of resolution than do separation assemblies employing other currently available materials. Moreover, the material is advantageous over other size exclusion-based separation materials due to the reliability in pore size and shape mentioned above.

The method of the present invention is also advantageous over other separation technologies in general, since the unique mesopore system present in the material affords a special intimacy between specialized separating agents and substances sought to be isolated. In short, the mesopore system of the present material provides a unique proximity of contact between the separating agent and the substance to be isolated, resulting in a more efficient separation. This efficiency in separation is highly advantageous in chemical and biological applications where sensitive purifications or separations are required.

Finally, the method of the present invention is advantageous in that the molecular sieve material incorporated therein exhibits a relatively high degree of structural stability, thereby providing it with an improved resistance to extremes in operational conditions, such as pH and temperature. Consequently, the method of the present invention may be employed in a wider variety of technologies than other currently available molecular sieve separation materials.

For a better understanding of the present invention, together with other and further objects, reference is made to the following description, the scope of which will be pointed out in the appended claims.

DETAILED DESCRIPTION OF TIME PREFERRED EMBODIMENTS

The method of the present invention involves the use of a new class of molecular sieves which can be employed to perform the separation of component substances contained within a mixture. The molecular sieve employed in the method of the present invention can be characterized as an inorganic, porous, non-layered crystalline phase material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C. The crystalline phase material has a unique property wherein a high concentration of hydroxyl groups may be present within the pore openings of the synthesized or calcined material.

Additionally, the material used in the separation method of the present invention may be modified to anchor or incorporate a separating agent upon the pore walls of the material. In particular, suitable separating agents include substances which may be attached to or adsorbed on the pore walls in order to perform a separation by inducing a retention of at least one of the components of a mixture within the pores of the material.

Generally, the separating agent will be in solid or liquid form and anchored to the pore walls by at least one chemical bond. Alternatively, a substance may be adsorbed upon the pore walls wherein the walls provide the requisite support. For example, in liquid-liquid chromatography systems, a liquid stationary phase could be adsorbed onto the pore walls to function as a separating agent. Upon contact with a mobile phase carrying a particular solute having greater solubility within the stationary phase, the solute will migrate out of the mobile phase and partition into the stationary phase based upon its relative solubility between the two phases.

More commonly, however, the separating agent will be a solid anchored to the pore walls. Typically, these solids are functional groups which are anchored or incorporated into the molecular sieve material using a particular method set forth below which involves contacting the material with a treatment composition comprising $M'X'Y'_n$. In this manner, functional groups may be incorporated into the molecular sieve material to perform a separation or provide unique catalytic sites within the pores or, alternatively, to act as a pore size reducing agent so that the pore size may be tailored for the specific separation in which it is employed. Such functional groups may also serve to modify the activity of catalytic sites already present in the molecular sieve material.

For the purposes of the present application, a "functional group" will be understood to be a characteristically reactive, bonded group of a chemical compound. Similarly, the term "functionalization" will be understood to be the incorporation of a bonded functional group into the molecular sieve material.

Additionally, the material of the present invention may be used in size exclusion-type separations with or without a separating agent or other functional group attached to the pore walls. Since the material affords the artisan with an improved ability to control pore size and shape, the material may be modified to perform a size exclusion function in a variety of applications.

In a size exclusion-based separation, the pore size is tailored so as to exclude larger molecules and allow smaller molecules to enter and become retained therein. Further specificity may be added to the separating capabilities of the material if the pore walls receive a separating agent or other functional group which is capable of retaining specified components of a mixture within the pores of the material. In particular, such a separation involves both a size exclusion separation as well as a retentive association of the separating agent with at least one component in the mixture to be separated. Consequently, the resulting material functions to perform an improved separation based upon size exclusion principles in conjunction with a specified interaction between a preselected separating agent and at least one component of a mixture.

While the molecular sieve material of the present invention may be employed to perform size exclusion-based separations in conjunction with preselected separating agents, the material may alternatively be employed to perform separations based solely upon the interaction of a separating agent supported on the pore walls and a component in a mixture to be separated. In such a separation, the components of the mixture to be separated will undergo a selective separation based solely upon a retentive association of particular mixture components with the separating agent incorporated on the pore walls of the material.

As previously mentioned, the separating agent incorporated in the method of the present invention may be a substance, such as a liquid or gas, suitable for adsorption upon the pore wall or, alternatively, a substance which may be chemically coupled to the pore wall. Separations which involve the adsorption of a liquid or gas upon the pore walls of the material are most commonly employed in liquid-liquid or liquid-gas chromatography systems wherein the stationary phase is a liquid supported upon an inert substrate. The mobile phase is typically a gas or liquid mixture that is intimately contacted with the stationary phase in order to allow certain components of the mixture to partition into the stationary phase and become retained therein due to some physical characteristic which causes one of the components to more readily migrate out of the mobile phase and into the stationary phase.

Alternatively, a preselected separating agent may be coupled to the pore walls by some means other than adsorption. Typically, these separating agents will be coupled to the pore walls by at least one chemical bond. The pore walls of the material may be functionalized so as to impart a separation specificity to the material or, additionally, to provide modification in pore size or shape. A variety of functional groups may be incorporated upon the pore walls, thereby providing a method of modifying the material of the present invention so that it may be employed in a host of separation technologies. In particular, certain functional groups may be attached to the pore walls of the material to impart a preselected set of sorptive characteristics thereto. Consequently, the resulting modified material is capable of performing a specified separation based upon the selective sorption of particular components contained within a mixture.

Moreover, the method of the present invention also provides for further modification of the material by coupling a specialized moiety to the functionalized walls, thereby promoting further specificity for the separation. For example, ion exchanging moieties may be coupled to the pore wall via a functional group, wherein at least one of the components of the mixture to be separated interacts with the moiety and becomes retained within the pores via an ion exchange mechanism. Alternatively, moieties may be selected from the group consisting of peptides, peptide fragments and peptide conjugates wherein at least one of the components of the mixture to be separated is retained within the pores by way of a particular binding affinity for the moiety.

Generally, most of the functional groups and specified moieties mentioned above are solids and are incorporated into the molecular sieve material by way of a functionalization reaction. This reaction may be described according to the formula

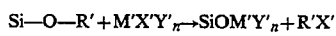

wherein Si—O—R' is a site in the lattice of the crystalline material.

R'=H+ or $R_4N^+$ which is the organic cation specified in the crystallization methods described hereinbelow.

M'=Elements of Groups IIA, IIIA, IVA, VA, VIA, VIIIA, IB, IIB, IIIB, IVB, VB, or VIB of the Periodic Table of the Elements, (Sargent-Welch Scientific Co. Cat. No. S-18806, 1979). Preferred elements for M' are Groups IVA, VIA, VIIIA, IIIB and IVB, and most preferred elements for M' are titanium, chromium, iron, cobalt, nickel, boron, aluminum and silicon.

X' = halides, hydrides, alkoxides of 1-6 carbon atoms, alkyls of 1-18 carbon atoms, alkenyls of 1-18 carbon atoms, aryls of 1-18 carbon atoms, acetates, aryloxides of 1-18 carbon atoms, sulfonates and nitrates. Preferred substituents for X' are halides, alkoxides of 1-6 carbon atoms and acetates.

Y' can be selected from the substituents described for X', or amines, phosphines, sulfides, carbonyls and cyanos. Preferred substituents for Y' are those described for X', amines and sulfides. Most preferred substituents for Y' are those described for X' and amines; and n=1-5.

Nonlimiting examples for M'X'Y'$_n$ include chromium acetate, chromium nitrate, tetraethylorthosilicate, tetramethylorthosilicate, titanium tetraethoxide, aluminum isopropoxide, aluminum tri-sec butoxide, hexamethyldisilazane, di-sec-butoxyaluminoxytriethoxysilane, diethylphosphatoethyltriethoxysilane, trimethylborate, chlorodimethylalkylsilane wherein alkyl has 1-18 carbon atoms, ammonia-borane, borane-tetrahydrofuran and dimethylsulfide-dibromoborane.

The ratio of treatment composition to treated composition of matter, duration of treatment and temperature are not critical and may vary within wide limits. The temperature may be, for example, from about $-70°$ C. to about 250° C., with from about 25° C. to about 100° C. preferred; and the time may be from about 0.1 to about 100 hours, with from about 0.1 to about 30 hours preferred and from about 0.1 to about 24 hours most preferred.

The treated crystalline material can be used as is or may be further subjected to a thermal treatment or treatment with a reactive gas such as oxygen or carbon monoxide for activation. The treated material may be calcined in a reactive or inert gas such as $NH_3$, $PH_3$, air, $O_2$, $N_2$, Ar, $SiH_4$, $H_2$ or $B_2H_6$.

The treated crystalline material may be described as having functional groups within it according to the formula

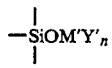

These functionalized sites may be, for example:

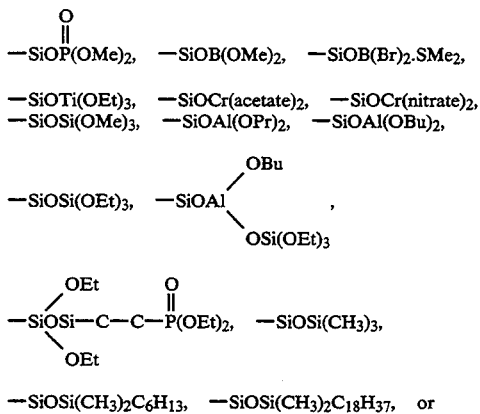

—SiOSi(CH$_3$)$_2$C$_6$H$_{13}$,  —SiOSi(CH$_3$)$_2$C$_{18}$H$_{37}$, or

-continued
—SiOSi(CH$_3$)$_2$C$_6$H$_5$; wherein Me=CH$_3$, Et=C$_2$H$_5$, Pr=C$_3$H$_7$, Bu=C$_4$H$_9$.

In these examples, —Si represents a site in the lattice of the crystalline material. Two additional bonds on the Si are not shown. The invention is not limited to these listed functionalized sites.

As demonstrated hereinafter, the inorganic, non-layered mesoporous crystalline material of this invention has the following composition:

$$M_{n/q}(W_aX_bY_cZ_dO_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2.

In the as-synthesized form, the material of this invention has a composition, on an anhydrous basis, expressed empirically as follows:

$$rRM_{n/q}(W_aX_bY_cZ_dO_h)$$

wherein R is the total organic material not included in M as an ion, and r is the coefficient for R, i.e. the number of moles or mole fraction of R. The M and R components are associated with the material as a result of their presence during crystallization, and are easily removed or, in the case of M, replaced by post-crystallization methods hereinafter more particularly described.

To the extent desired, the original M, e.g. sodium ions of the as-synthesized material of this invention can be replaced in accordance with techniques well known in the art, at least in part, by ion exchange with other ions. Preferred replacement ions include metal ions, hydrogen ions, hydrogen precursor, e.g. ammonium ions and mixtures thereof. Particularly preferred ions are those which tailor the catalytic activity for certain hydrocarbon conversion reactions. These include hydrogen, rare earth metals and metals of Group IA (e.g. K), IIA (e.g. Ca), VIIA (e.g. Mn), VIIIA (e.g. Ni), IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of at least about 13 Å or from about 13 Å to about 200 Å. The materials of this invention will have uniform pores within the range of from about 13 Å to about 200 Å, more usually from about 15Å to about 100 Å. For the purposes of this application, a working definition of "porous" is a material that sorbs into intracrystalline cavities at least 1 gram of a small molecule, such as Ar, $N_2$, n-hexane or cyclohexane, per 100 grams of the solid.

The composition of the mesoporous crystalline material is described in U.S. Pat. Nos. 5,102,643 and 5,098,684; and the synthesis of the material is described in U.S. Pat. Nos. 5,108,725 and 5,057,296, the entire disclosures of which are herein incorporated by reference in their entireties. The functionalization of the material is described in U.S. Pat. No. 5,145,816 which is herein incorporated by reference in its entirety.

The inorganic, porous, non-layered crystalline phase material, which exhibits, after calcination, an X-ray diffraction pattern with at least one peak at a d-spacing greater than about 18 Å Units with a relative intensity of 100 and has a benzene adsorption capacity of greater than 15 grams benzene per 100 grams of anhydrous crystal at 50 torr and 25° C., has been termed M41S.

The inorganic, porous, crystalline phase material having a hexagonal arrangement of uniformly-sized pores at least about 13 Å in diameter and exhibiting, after calcination, a hexagonal electron diffraction pattern that can be indexed with a $d_{100}$ value greater than 18 units, has been termed MCM-41 and is also included within the class of crystalline materials termed M41S.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites.

In one form, the material appears to have a hexagonal arrangement of large channels that can be synthesized with open internal diameters from about 13, e.g., from about 15Å to about 200 Å. The term "hexagonal" is intended to encompass not only materials that exhibit mathematically perfect hexagonal symmetry within the limits of experimental measurement, but also those with significant observable deviations from that ideal state.

A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$, values from the electron diffraction patterns.

Some of these preparations of the material of the present invention give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them.

Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100} = a_0 \sqrt{3}/2$.

This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, the crystalline material of the invention may be further characterized by an X-ray diffraction pattern with at least one peak at a position greater than about 18 ÅUnits d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. This sorption is based on the assumption that the crystal material has been treated if necessary in an attempt to insure no pore blockage by incidental contaminants.

The equilibrium benzene adsorption capacity characteristic of this material is measured on the basis of no pore blockage by incidental contaminants. For instance, the sorption test will k,e conducted on the crystalline material phase having any pore blockage contaminants and water removed by ordinary methods. Water may be removed by dehydration techniques, e.g. thermal treatment. Pore blocking inorganic amorphous materials. e.g. silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at least two peaks at positions greater than about 10 Å Units d-spacing (8.842 degrees two-theta for Cu K-alpha radiation), at least one of which is at a position greater than about 18 Å A Units d-spacing, and no peaks at positions less than about 10 Å units d-spacing with relative intensity greater than about 20% of the strongest peak.

Still more particularly, the X-ray diffraction pattern of the calcined material of this invention will have no peaks at positions less than about 10 Å units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Moreover, the calcined inorganic, non-layered crystalline material of the invention is characterized as having a pore size of about 13 Å or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Å units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines.

Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 450° C.–700° C. or about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the composition of the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed.

These components can be included in the composition by way of co-crystallization, exchanged into the composition to the extent a Group IIIB element, e.g. aluminum, is in the structure, impregnated therein or intimately physically and mixed therewith. For example, such components can be impregnated in or onto the composition by treating the silicate with a solution containing a metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 370° C. or 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 925° C., or up to 750° C. with the hexagonal form. The thermally treated product is particularly useful in the catalysis of certain hydrocarbon conversion reactions.

The crystalline material for use in this invention, should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The usual method for synthesis of the ultra-large pore crystalline material involves preparation of a particular reaction mixture comprising sources of alkali or alkaline earth metal cation, if desired, one or a combination of oxides selected from the group consisting of divalent element, trivalent element, tetravalent element and pentavalent element, an organic directing agent and solvent or solvent mixture, maintaining said mixture under sufficient conditions of pH, temperature and time for formation of said composition of matter, and recovering said composition of matter.

In this usual method, the organic directing agent is an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof. The compound from which the above organic directing agent ammonium or phosphonium ion is derived may be, for example, the hydroxide, halide, silicate or mixture thereof. The solvent or solvent mixture for use in the usual method comprises a $C_1$–$C_6$ alcohol, $C_1$–$C_6$ diol, water or mixture thereof, with water preferred.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described.

This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3$/$YO_2$ | 0 to 0.5 | 0.001 to 0.5 |
| $Al_2O_3$/$SiO_2$ | 0 to 0.01 | 0.001 to 0.01 |
| $X_2O_3$/($YO_2$ + $Z_2O_5$) | 0.1 to 100 | 0.1 to 20 |
| $X_2O_3$/($YO_2$ + WO + $Z_2O_5$) | 0.1 to 100 | 0.1 to 20 |
| Solvent/($YO_2$ + WO + $Z_2O_5$ + $X_2O_3$) | 1 to 1500 | 5 to 1000 |
| $OH^-$/$YO_2$ | 0 to 10 | 0 to 5 |
| ($M_{2/e}O$ + $R_{2/f}O$)/($YO_2$ + WO + $Z_2O_5$ + $X_2O_3$) | 0.01 to 20 | 0.05 to 5 |
| $M_{2/e}O$/($YO_2$ + WO + $Z_2O_5$ + $X_2O_3$) | 0 to 10 | 0 to 5 |
| $R_{2/f}O$/($YO_2$ + WO + $Z_2O_5$ + $X_2O_3$) | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O$/($YO_2$+WO+$Z_2O_5$+$X_2O_3$) ratio is important. When this ratio is less than 0.01 or greater than 2.0, impurity products tend to be synthesized at the expense of the present material.

A second method for synthesis of the present crystalline material involves a reaction mixture having an $X_2O_3$/$YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3$/$YO_2$ | 0 to 0.5 | 0.001 to 0.5 |
| $X_2O_3$/($YO_2$ + $Z_2O_5$) | 0.1 to 100 | 0.1 to 20 |
| $X_2O_3$/($YO_2$ + WO + $Z_2O_5$) | 0.1 to 100 | 0.1 to 20 |
| Solvent/($YO_2$ + WO + $Z_2O_5$ + $X_2O_3$) | 1 to 1500 | 5 to 1000 |
| $OH^-$/$YO_2$ | 0 to 10 | 0 to 5 |
| ($M_{2/e}O$ + $R_{2/f}O$)/($YO_2$ + WO + $Z_2O_5$ + $X_2O_3$) | 0.01 to 20 | 0.05 to 5 |
| $M_{2/e}O$/($YO_2$ + WO + $Z_2O_5$ + $X_2O_3$) | 0 to 10 | 0 to 5 |
| $R_{2/f}O$/($YO_2$ + WO + $Z_2O_5$ + $X_2O_3$) | 0.01 to 2.0 | 0.03 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used.

This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $Al_2O_3$/$SiO_2$ | 0 to 0.5 | 0.001 to 0.5 |
| Solvent/$SiO_2$ | 1 to 1500 | 5 to 1000 |
| $OH^-$/$SiO_2$ | 0 to 10 | 0 tb 5 |
| ($M_{2/e}O$ + $R_{2/f}O$)/($SiO_2$ + $Al_2O_3$) | 0.01 to 20 | 0.05 to 5 |
| $M_{2/e}O$/($SiO_2$ + $Al_2O_3$) | 0 to 10 | 0 to 3 |
| $R_{2/f}O$/($SiO_2$ + $Al_2O_3$) | 0.01 to 2.0 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O$/($SiO_2$+$Al_2O_3$) is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

A fifth method includes adding an auxiliary organic to the reaction mixture prior to maintaining it for crystallization of the ultra-large pore crystalline material, such as prior to, during or immediately following addition of the other reaction mixture components. It is believed that the "primary template" in this method becomes the mixture of the auxiliary organic and the organic directing agent or organic directing agent mixture.

The auxiliary organic must be selected from the group of organic compounds consisting of (1) aromatic hydrocarbons and amines of from 5 to 20 carbons and halogen- and $C_1$-$C_{14}$ alkyl-substituted derivatives thereof, (2) cyclic aliphatic hydrocarbons and amines of from 5 to 20 carbons and halogen- and $C_1$-$C_{14}$ alkyl-substituted derivatives thereof, (3) polycyclic aliphatic hydrocarbons and amines of from 6 to 20 carbons and halogen- and $C_1$-$C_{14}$ alkyl-substituted derivatives thereof, (4) straight and branched aliphatic hydrocarbons and amines of from 3 to 16 carbons and halogen-substituted derivatives thereof, and (5) combinations thereof. Of this group of organic compounds, the aromatic hydrocarbons (e.g. $C_6$-$C_{20}$), cyclic aliphatic hydrocarbons and polycyclic aliphatic hydrocarbons, and combinations thereof, are preferred.

In this group of auxiliary organic compounds for use in the present improved method, the halogen substituent in substituted derivatives may be, for example, bromine. The $C_1$-$C_{14}$ alkyl substituent in the substituted derivatives may be linear or branched aliphatic chains, such as, for example, methyl, ethyl, propyl, isopropyl, butyl, pentyl and combinations thereof. Non-limiting examples of these auxiliary organics include, for example, p-xylene, trimethylbenzene, triethylbenzene and triisopropylbenzene.

With the inclusion of the auxiliary organic into the reaction mixture, the mole ratio of auxiliary organic/$YO_2$ will be from about 0.05 to about 20, preferably from about 0.1 to about 10, and the mole ratio of auxiliary organic/$R_{2/f}O$ will be from about 0.02 to about 100, preferably from about 0.05 to about 35. The useful range of temperatures for this crystallization is from about 25° C. to about 175° C., preferably from about 50° C. to about 150° C. Pore size and volume will vary with the amount and physical properties, e.g. structure, boiling point, density, polarity, etc., of the auxiliary organic used.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

Non-limiting examples of various combinations of W, X, Y and Z contemplated for the first and second synthesis methods of the present invention include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

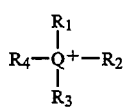

wherein Q is nitrogen or phosphorus and wherein at least one of $R_1$, $R_2$, $R_3$ and $R_4$ is aryl and alkyl of from 7 to 36 carbon atoms, e.g. —$C_7H_{15}$, —$C_{10}H_{25}$, —$C_{12}H_{21}$, —$C_{14}H_{29}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present invention involves use of the modified ultra-large pore material as adsorbents and separation vehicles in pharmaceutical and fine chemical applications. For example, these modified ultra-large compositions may be used in the purification of drugs like insulin or be used as solid vehicles for the controlled delivery of drugs. Another application for use of these ultra-large pore materials involves waste disposal where the extraordinary pore volumes are exploited. Therefore, at least one component can be partially or substantially totally separated from a mixture of components having differential sorption characteristics with respect to the present modified ultra-large pore composition by contacting the mixture with the composition to selectively sorb the one component.

Examples of this separation method include contacting a mixture comprising water and at least one hydrocarbon component (e.g., hexane, hexadecane, benzene, and/or xylene), whereby at least one hydrocarbon component is selectively sorbed. Another example includes selective sorption of at least one hydrocarbon component (e.g., an aromatic such as benzene or xylene), from a mixture comprising same and at least one additional hydrocarbon component (e.g., an alcohol such as ethanol).

The present invention also involves use of the modified ultra-large pore material for separations by size exclusion of molecules. For example, a synthetic mesoporous crystalline material prepared by the herein detailed method having a pore size of about 16 Å as synthesized to provide a trimethylsilylated product having an effective pore diameter of about 7 Å. The functionalized material is then effective for separating mixtures of adamantane and its dimers, trimers, etc. The critical molecular diameter of adamantane is 7 Å; diamantane, $7 \times 11$ Å; and triamantane, $11 \times 12$.

It may be desirable to incorporate the modified crystal composition for use herein with another material. Such other materials include active and inactive materials and synthetic or naturally occurring zeolites as well as inorganic materials such as clays, silica and/or metal oxides, such as alumina, titania, and/or zirconia. The latter may be either naturally occurring or in the form of gelatinous precipitates or gels, including mixtures of silica and metal oxides. The clays may be naturally occurring clays, e.g., bentonite and kaolin, which are added to improve the crush strength of the sorbent under commercial operating conditions. Such materials, i.e., clays, oxides, etc., function as binders. It is advantageous to provide a sorbent having a good crush strength because it prevents the composition from breaking down into a powder-like material under the mechanical stresses occurring in commercial applications. These clay binders have been employed normally only for the purpose of improving the crush strength.

Naturally occurring clays which can be composited with the new modified crystal include the montmorillonite and kaolin family. These families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new modified crystal can be composited with a porous matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. It may be desirable to provide at least a part of the foregoing matrix in colloidal form so as to facilitate extrusion of the bound sorbent components.

The relative proportions of finely divided modified crystalline material and inorganic oxide matrix vary widely, with the crystal content ranging from about 1 to about 90 percent by weight, and more usually, particularly when the composite is prepared in the form of beads, the crystal content ranges from about 2 to about 80 weight percent of the composite.

As a result of the aforementioned process, the pore walls of the molecular sieve material undergo a special functionalization which renders them particularly advantageous when the material is deployed in a separation process. In particular, the functionalization may impart a preselected set of sorptive characteristics to the pore walls, whereby the added functional group serves as a separating agent to retain at least one component in a mixture to be separated. Alternatively, the functional group may provide a method of coupling a specialized moiety to the walls as described below.

As previously mentioned, the method of the present invention also provides a unique separation methodology in that the molecular sieve material incorporated therein may be further modified to include a specialized moiety which imparts an additional separation specificity to the material. Generally, the specialized moiety can be coupled to the internal pore walls of the material either directly or, more commonly, by way of a functional group which has been attached to the walls using the various methods set forth above. If the moiety is coupled directly to the pore walls, the attachment can be accomplished by bonding techniques well-known to those skilled in the art.

Accordingly, various specialized moieties may be coupled to the pore walls of the material of the present invention in order to provide unique separation capabilities for a variety of technologies. For example, ion exchanging moieties may be coupled to the pore walls wherein at least one of the components of the mixture to be separated interacts with the moiety and becomes retained within the pores via an ion exchange mechanism.

Alternatively, moieties may be selected from the group consisting of peptides, peptide fragments and peptide conjugates wherein at least one of the components of the mixture to be separated is retained within the pores by way of a particular binding affinity for the moiety. For purposes of this application, peptide conjugates can be thought of as peptides or peptide fragments which have been chemically linked to other non-peptide chemical groups, particularly inorganic compounds or elemental metals. Typically, in situations where the molecular sieve material includes specialized moieties which perform the requisite separation by way of ion exchange or binding affinity, the material will be incorporated into ion exchange or affinity-based chromatography systems.

A wide variety of specialized moieties are well-known and available to those skilled in the art. Consequently, the molecular sieve material incorporated in the separation methods of the present invention can be tailored or modified for use in a wide range of biological and chemical separations.

For example, the separation method of the present invention can be employed in blood processing to perform purification and separation of selective plasma fractions, such as various blood factors and enzymes, by coupling antibodies directed toward such fractions to the pore walls of the molecular sieve material. Conversely, specific antigens may be coupled to the pore walls in order to bind to and retain a particular antibody sought to be isolated. Alternatively, antibodies to particular viruses may be coupled to the pore walls in order to perform a separation/purification of a biological fluid mixture.

Generally, the molecular sieve material of the present invention may be modified to select out a particular chemical or biological component present in a mixture provided that the component has an affinity-based counterpart molecule which can be attached to the pore walls of the material to serve as a specialized moiety which is selective for that particular component. It will be readily apparent to those skilled in the art that the specialized moiety selected must have a suitable stereochemistry and be of a suitable molecular weight in order to be effectively attached to the pore walls without disrupting the efficiency of the separation.

In summary, the method of the present invention incorporates a unique molecular sieve material to perform a separation function based upon either size exclusion principles or the specified interaction between at least one component of a mixture to be separated and a separating agent supported by the pore walls of the material. The separating agent may either be a liquid or a gas which has been adsorbed on the pore walls or, alternatively, some substance which is chemically coupled to the internal walls.

In particular, the separating agent is typically some substance which undergoes a retentive association with at least one of the components in a mixture to be separated, thereby invoking a separation of at least one of the components from at least one other component. In situations where the separating agent is chemically coupled to the pore walls, it will usually be present in solid form as a variation upon one of the functional groups or the specialized moieties discussed above. If the separating agent is a functional group, such as those imparting a preselected set of sorptive characteristics to the material, it will typically be attached to the pore walls of the molecular sieve material using the modification techniques set forth above. If the separating agent is a specified moiety, such as an ion exchanging compound or a particular protein having a selective binding affinity, it may be attached directly to the pore walls using binding technologies known in the art or by way of the functional groups outlined above.

Regardless of the nature of the separating agent or its method of incorporation into the molecular sieve material of the present invention, the resulting separation is generally performed by fixing the molecular sieve material, either in its synthesized or its various substituted forms, in a stationary condition so that it can be adequately contacted with a mixture to be separated. The mixture should be contacted with the material for a sufficient time and under conditions suitable for inducing a retention of at least one component of the mixture within the pores of the material, whereby the component is separated from at least one other component present in the mixture.

Since the molecular sieve material is fixed in a stationary condition, the mixture containing the components must be in a flowable condition in order to adequately contact the stationary material. These components may be presented to the fixed stationary phase in either a gaseous or a liquid form or, alternatively, by way of a gaseous or liquid carrier medium.

As previously described, the molecular sieve material utilized in the separation methods of the present invention may be incorporated either in its unmodified "synthesized" form or in a form which has been modified by incorporating a separating agent, such as the functional groups or specified moieties described above, upon its pore walls.

One of the most common approaches for incorporating the method of the present invention involves the deployment of the molecular sieve material into a chromatographic system. As previously mentioned, there are a wide variety of chromatography systems available including ion exchange, affinity, reverse phase, elution, column, adsorption, flat-bed, batch, thin layer, paper, gel permeation and other size exclusion-based chromatography systems as well as gas, liquid and solid chromatography. The nomenclature for the different types of chromatography is based upon either the type of mobile phase employed, the nature of the stationary phase, the nature of the interaction between the stationary phase and the substance retained by it or, alternatively, the type of technique or apparatus used in the system.

Generally, the method of the present invention can be adapted for all types of chromatography provided that the chromatography system utilizes a solid as either a separating agent or a support for the same. For example, ion exchange, affinity, elution, column, adsorption, flatbed, batch, thin layer and gel permeation chromatographic systems all incorporate solids in this fashion. Alternatively, paper chromatography utilizes paper as a support and some liquid solvent, typically water, as a stationary phase, thereby avoiding the need for any additional solid. The mechanics involved in adapting solids for use in the various chromatographic methods set forth above are well-known to those skilled in the art and the appropriate modification are readily available in a wide variety of texts and other literature.

For example, it is well-known that if a molecular sieve material is incorporated into a chromatographic system in order to perform a size exclusion-based separation, the material is usually disposed in a suitable column or, alternatively, in another format such as a gel matrix suitable for performing gel permeation chromatography. Similarly, if the molecular sieve material is involved in ion exchange, affinity or some sorption-based chromatography, the material is usually incorporated into various chromatographic configurations, such as flat-bed, batch and column chromatography systems, depending upon the particular requirements of the separation to be performed. Furthermore, it is well-known that various chromatography techniques may be combined in order to solve unique separation problems.

In addition to its application in chromatographic techniques, the separation method of the present invention may be adapted for performing a separation in other technologies which require a solid as a means for separation or a support for the same. For example, the present method may be incorporated into a variety of membrane-based techniques including filtrations, clarifications, membrane reactions and other membrane-related separations, such as ultrafiltration, dialysis, electrodialysis, reverse osmosis, gas or liquid diffusions and facilitated transport mechanisms.

Generally, the membrane-based separations mentioned above are accomplished by incorporating the molecular sieve material into a suitable membrane after any optional modifications are performed in accordance with the method of the present invention in order to impart any additional separation selectivity to the material. In particular, the membranes utilized in these membrane-based separations can be constructed so as to incorporate any variation of the molecular sieve material described above, provided that the set of separation conditions in which the membrane operates does not appreciably inhibit the efficiency of the separation.

After the material has been treated to impart any desired modifications thereto, it can be formed into a thin cohesive, continuous, unsupported membrane under crystallization conditions familiar to those skilled in the art. Typically, the crystallization of the material into a continuous layer is induced upon a non-porous forming surface and the material is subsequently removed in order to obtain a thin, non-composite membrane. Examples of procedures for fabricating non-composite membranes have been described in U.S. Pat. Nos. 3,392,103, 3,499,537, 3,628,669, 3,791,969, 3,413,219 and 4,238,590, all of which are incorporated herein by reference thereto.

Alternatively, the material of the present invention may be deposited onto a porous, inorganic substrate in order to form a thin layer composite membrane. Examples of procedures involving the formation of composite membranes or filters containing dispersed particles of molecular sieve-type materials have been described in U.S. Pat. Nos. 3,266,973, 3,791,969, 4,012,206, 4,735,193 and 4,740,219, the disclosures of which are also incorporated herein by reference thereto.

The membrane can be produced, for example, by synthesis under hydrothermal conditions on a non-porous substrate forming surface, such as a polymer, a metal or glass. Suitable polymer surfaces are, for example, fluorocarbon polymers such as tetrafluoroethylene (TFE) and fluorinated ethylene-propylene polymers (FEP). Suitable metal surfaces are, for example, silver, nickel, aluminum and stainless steel. A thin layer of metal on glass or an organic polymer or other material may be used as the forming surface. A thin layer of a polymer film on glass or other material may also be used as the forming surface. The forming surface may have various configurations. For example, the surface may be flat, curved, a hollow cylinder or honeycomb-shaped.

In forming the membranes of the present invention, a non-porous surface is contacted with a chemical mixture capable of forming the desired crystalline material under crystallization conditions. After a period of time under suitable conditions, a cohesive membrane of crystallized material forms on the non-porous substrate surface. The thickness dimension of the membrane may vary from about 0.02 microns to about 1000 microns depending upon the length of time the surface is contacted with the chemical mixture and the amount of mixture provided. Other means such as varying the temperature or the ratio of crystallization mixture to forming surface area are also effective in adjusting the membrane thickness to a desired dimension.

The time of contacting of the surface with the reaction mixture may be from about 0.5 hrs. to about 72 hrs., preferably from about 1 hr. to about 10 hrs. and at a temperature ranging from about 25° C. to about 175° C., preferably from about 50° C. to about 150° C. Additionally, the contacting can be performed at atmospheric, subatmospheric or superatmospheric pressures.

After the desired period of time, the substrate, now coated with crystalline material, is removed from contact with the chemical mixture, washed with distilled water and allowed to dry. The layer of crystalline material may be removed from the non-porous surface by various means depending upon the material chosen for the forming surface. The layer may be separated from polymeric surfaces, for example, by mechanical means such as careful scraping or peeling. Removal from metal surfaces may be accomplished with the use of solvents such as acetone, or by dissolving the metal with acid such as aqueous hydrochloric or nitric acid. With a support consisting of metal or metallized material such as aluminum on glass or teflon, treatment with an aqueous mineral acid can be employed.

The membrane material may also be calcined before or after removal from the substrate for example in an inert atmosphere or in air at a temperature ranging from about 200° C. to about 700° for about 0.5 hrs. to about 15 hrs.

Once a membrane containing the molecular sieve material of the present invention has been formed, it may be incorporated into any suitable membrane-based separation including those mentioned above. In particular, a feedstream mixture including at least a first component at a first concentration and a second component at a second concentration is contacted with the separation membrane comprising the molecular sieve material of the present invention. The contact should occur under separation conditions such that the microstructure of the material present in the membrane affords a greater permeability of the first component through the membrane than the second component. As a result, an effluent stream is produced wherein the concentration of the second component has been substantially reduced.

Generally, the feedstream mixture will contain the components in either a gaseous or liquid form so that they are readily flowable for contact with the membrane. Alternatively, the feedstream mixture may contain the components suspended in a liquid or gaseous carrier medium so that they are suspended for contact with the separation membrane.

Additionally, another separation technique contemplated by the method of the present invention involves utilizing the membrane as a membrane reactor. Typically, the membrane is rendered catalytically active by methods known to those skilled in the art and a feedstock is passed through the upstream face of the membrane under catalytic conditions. For cases where some or at least one of the reaction products have a higher permeability than the reactant(s), they will emerge from the downstream side of the membrane. In equilibrium limited reactions, this approach will lead to higher single-pass conversion of the reactant(s) than normally provided by thermodynamic equilibrium constraints. At least one or all of the reaction products are collected on the downstream side of the membrane.

Other applications of membranes incorporating the material of the present invention as membrane reactors are well-known in the art and generally involve two unit operations, namely a separation and a chemical reaction. Generally, product separation translates into enhanced selectivity by depressing undesirable side reactions and/or increased conversation due to equilibrium shifting and/or the same conversion at a lower temperature. Examples of membrane reactors incorporating the unique material and methods of the present invention include enzymatic catalysis for various biological laboratory manipulations such as protein hydrolysis, cellulose saccharification and monoclonal antibody production.

The following Examples serve to further illustrate the present invention but are not meant in any way to limit or restrict the effective scope of the same.

EXAMPLE 1

An inorganic mesoporous material was prepared according to the following example. A solution of 2.7 grams of $NaAlO_2$ (43.5% $Al_2O_3$, 30% $Na_2O$) in 146.9 grams of water was mixed with 34.5 grams of NaOH, 189.1 grams of cetyltrimethylammonium hydroxide solution prepared by contacting a 29 wt % N,N,N-trimethyl-1-hexadecanaminium chloride solution with an excess of hydroxide-for-halide resin, and 110.7 grams of Ultrasil (92% $SiO_2$). After stirring overnight it was loaded into a 600 cc autoclave and reacted at 150° C. with 400 rpm stirring for 72 hours. The mixture had the following relative molar composition:

0.25 moles $Al_2O_3$
10 moles $Na_2O$
36 moles $SiO_2$
2.5 moles $(CTMA)_2O$
362.5 moles $H_2O$ Following filtration of the mixture, the solid product which precipitated from the filtrate was recovered by filtration, washed with water, then calcined at 550° C. for 10 hours in air.

The calcined product proved to have a surface area of 1193 m²/g and the following equilibrium adsorption capacities in grams/100 grams anhydrous sorbent:

| | |
|---|---|
| $H_2O$ | 10.2 |
| Cyclohexane | >50 |
| n-Hexane | 48.9 |
| Benzene | 68.1 |

The X-ray diffraction pattern of the calcined product of this example may be characterized as including a very strong relative intensity line at 50.7±3.0 Å d-spacing and a weak line at 30.7+1.0 Å. The M41S material constituted the porous crystalline phase material which was used in separations as is or functionalized.

EXAMPLE 2

A 0.50 gram portion of a calcined product prepared as in Example 1 was added to a rapidly stirred solution of 10 grams chlorotrimethylsilane in 15 grams of hexamethyldisiloxane. The mixture was refluxed under $N_2$ overnight, cooled, the reagents removed on a rotary evaporator, the product washed with two 10 ml portions of acetone and air dried to yield 0.53 grams of product.

A solid state magic angle spinning NMR spectrum of this product was obtained using 90 degree pulses at 1200 second intervals with proton decoupling. This spectrum showed peaks at 15 and −108 ppm. The peak at 15 ppm has been assigned to trimethylsilyl groups (T. Yanagisawa, et al., *Reactivity of Solids*, vol. 5, p. 167 (1988) and shows that the product has reacted. Integration of the two peaks showed that 17.9% of the silicons in the original product had been converted.

The internal pore volume of the trimethylsilylated product was compared to that of the starting material by both benzene sorption and argon physisorption. The total reduction in pore volume was measured as 48% by benzene and 34% by argon. The diameter of the TMS group was measured to be about 0.4–0.5 nm from CPK molecular models. An onion skin coating of TMS groups on the inside of the pore should, therefore, cause a decrease of 0.8–1.0 nm in pore diameter. The Horvath-Kowazoe transform of the argon isotherm shows the pore diameter to have decreased from 3.94–3.04 nm (0.90 nm) in agreement with what was predicted from the models.

(A) Water sorption was measured before and after the chlorotrimethylsilane treatment. The calcined product of Example 1 sorbed 10.0 weight percent water at 30° C. and 12.5 torr while the treated material sorbed 3.3 weight percent water. This demonstrates that trichloromethylsilane treatment increases the hydrophobic character of the novel crystalline material.

(B) Sorption selectivity of a portion of the calcined product of Example 1 is demonstrated by contact with a water/hexane mixture (50/50, by volume) before and after the chlorotrimethylsilane treatment in (A) supra. The treated material selectively adsorbs hexane compared to water from this mixture.

(c) Sorption selectivity of a portion of the calcined product of Example 1 is demonstrated by contact with a water/hexadecane mixture (50/50, by volume) before and after the chlorotrimethylsilane treatment in (A) supra. The treated material selectively sorbs hexadecane compared to water from this mixture.

(D) Sorption selectivity of a portion of the calcined product of Example 1 is demonstrated by contact with an ethanol/benzene mixture (50/50, by volume) before and after the chlorotrimethylsilane treatment in (A) supra. The treated material selectively sorbs benzene compared to ethanol from this mixture.

(E) Sorption selectivity of a portion of the calcined product of Example 1 is demonstrated by contact with a water/p-xylene mixture (50/50, by volume) before and after the chlorotrimethylsilane treatment in (A) supra. The treated material selectively sorbs p-xylene compared to water from this mixture.

By functionalizing the M41S material, the internal pore volume can be engineered to a desired size thereby obtaining a predetermined set of sorptive characteristics, which may be advantageously used in the separation of a first component from a second component. This example also demonstrates that by increasing the silicon content of the M41S material as in (A), the hydrophobic character of the crystalline material also increases. This characteristic is useful in separating water from water/hydrocarbon mixtures.

EXAMPLE 3

A portion of a product prepared in accordance with Example 2 is packed into a chromagraphic column according to well known procedures. A sample including adamantane, diamantane and triamantane at various flows is introduced at the head of the column and is allowed to pass through it. From the end of the column triamantane emerges first followed by diamantane and adamantane.

This example illustrates a size exclusion separation. The ultra large pore M41S material was modified by functionalizing its structure as in Example 2. Consequently, a sample of M41S having a pore size of about 16 Å was reduced to about 7 ÅA. The functionalized material is effective in separating adamantane from a mixture containing its trimers and dimers. The critical molecular diameter of adamantane is 7 Å; diamantane is 7×11 Å; and triamantane is 11×12 Å. Because the pore size of the functionalized M41S material is uniform, the separation of adamantane from its trimers and dimers is highly effective.

EXAMPLE 4

An inorganic, mesoporous, non-layered crystalline phase material having uniform pores was prepared. Four hundred grams of cetyltrimethylammonium (CTMA) hydroxide solution, prepared by contacting a 29 wt % N,N,N-trimethyl-1-hexadecanaminium chloride solution with an excess of hydroxide-for-halide resin, was combined with two hundred grams of tetramethylammonium (TMA) silicate solution (10% by wt. silica, 1:1, TMA:Si) with stirring. Fifty grams of HiSil, a precipitated hydrated silica containing about 6 wt % free water and about 4.5 wt % bound water of hydration and having an ultimate particle size of about 0.02 micron, was added. The resulting mixture was placed in a polypropylene bottle and put into a steam box (about 100° C.) for 48 hours. The mixture had a composition in terms of moles per mole of $Al_2O_3$:

391.4 moles of $SiO_2$
71.4 moles of $(CTMA)_2O$
61.6 moles of $(TMA)_2O$
9144 moles of $H_2O$ The resulting solid product was recovered by filtration and dried in air at ambient temperature. The chemical analyses of the as-synthesized product were:

| | |
|---|---|
| $SiO_2$ | 23.7 wt % |
| $Al_2O_3$ | 0.2 wt % |
| N | 2.3 wt % |
| C | 33.9 wt % |
| Ash, 1000° C. | 22.1 wt % |

A portion of the product from this example was then calcined at 540° C. for one hour in nitrogen, followed by six hours in air. The benzene sorption for this material was 39.5 wt % at 25° C.

EXAMPLE 5

The M41S product obtained in Example 4 was functionalized by treatment with titanium tetraethoxide. One gram of the air dried product of Example 4 was mixed with one gram titanium tetraethoxide at room temperature for overnight. The mixture was then reacted with 5 grams of water for one hour. The product was calcined in nitrogen at 538° C. for one hour then air for 6 hours at 538° C. The benzene sorption at 30° C. was 25.0 wt %.

EXAMPLE 6

The M41S product obtained in Example 4 was functionalized by treatment with aluminum tri-sec-butoxide. One gram of the air dried product of Example 4 was mixed with one gram aluminum tri-sec-butoxide at room temperature for overnight. The mixture was then reacted with 5 grams of water for one hour. The product was calcined in nitrogen at 538° C. The benzene sorption at 30° C. was 37.5 wt %.

Example 4 illustrates a crystallization procedure for M41S. Examples 5 and 6 demonstrate that functionalizing the M41S can be used to change its sorptive and consequently separation characteristics toward benzene from 25.0 wt % in Example 5 to 37.5 wt % in Example 6.

EXAMPLE 7

The M41S product obtained in Example 4 is coated with a polyethylene glycol (PEG) such as Carbowax 20M by slow evaporation of a solution of the glycol in tetrahydrofuran in which the M41S is suspended. Vacuum rotary evaporation is a particularly convenient method of coating.

Loadings of from 0.1–5% PEG may be used in packed gas chromatography columns in a conventional manner. They are particularly advantageous for separations of trace quantities of alcohols and ethers, for example, ethanol or methyl t-butylether, in hydrocarbons, for example, gasoline.

At loadings of 20–100% PEG (100%=1g polyethylene glycol/g M41S) the capacity for polar materials, such as alcohols, amines, and ethers, is so high that the M41S/PEG materials may be used as concentrators. A stream containing <100 ppm of the polar compound(s) is passed at low temperature over the M41S material until the effective concentration has been raised to a desired level (10–50 times for analytical purposes). The temperature of the M41S material is then raised rapidly and the polar materials released either for analysis or collection.

EXAMPLE 8

Preparation of dimethyloctylsilylated M41S was performed by adding to 100 ml dimethylformamide in an Erlenmeyer flask, 25 g chlorodimethyloctylsilane followed by 4.00 g as synthesized MCM-41 which had been dried overnight under an IR lamp. The flask was stoppered, the mixture stirred magnetically at room temperature overnight, filtered, the solid washed with chloroform and dried to 2.83 g under an IR lamp. Elemental analysis gave: C, 24.62%; Si, 32.58%, indicating an organic loading of 35.6% and a conversion of 20.6% of the silicon atoms to derivatized silicons. Solid state cross polarization magic angle spinning $^{13}$C NMR of the product showed the expected peaks for an octyl group and two methyl groups attached to an Si—O with positions shown in Table 1.

TABLE 1

| | $^{13}$C NMR data | | |
|---|---|---|---|
| Point | Shift (ppm) | Peak Height | Width (Hz) |
| 1 | 32.083 | 129. | 132. |
| 2 | 30.526 | 145. | 52.7 |
| 3 | 27.996 | 271. | 55.6 |
| 4 | 21.185 | 172. | 80.1 |
| 5 | 16.126 | 98. | 67.7 |
| 6 | 12.039 | 23. | 36.2 |
| 7 | 10.482 | 36. | 50.4 |
| 8 | −0.999 | 167. | 174. |
| 9 | −2.167 | 181. | 169. |

A solid state magic angle spinning Si—NMR spectrum of this product was obtained using 60 degree pulses at 20 second intervals with proton decoupling. This spectrum showed peaks at 12.8, 103.7, and −108.6 ppm. The peak at 12.8 ppm comes from the dimethyloctylsilyl silicons, the other peaks arise from the Si(O)$_4$ silicons of the framework. Integration of the Me$_2$OctSi peaks versus the Si(O)$_4$ peaks indicated a loading of 35.1% and a conversion of 20.3% of the silicons, in reasonable agreement with the elemental analysis.

EXAMPLE 9

The material of Example 8 is packed into a reverse phase HPLC (high performance/pressure liquid chromatography) column according to known procedures.

A sample containing benzene, anisole, phenol, and sodium benzenosulfonate is introduced into the column and allowed to pass through it using water as the eluting solvent. The solvent composition is gradually changed from water to methanol or from water to acetonitrile. The samples emerge from the column in reverse order of their polarity, that is, sodium benzenesulfonate first, then phenol, then anisole, with benzene last.

EXAMPLE 10

Packing material including an inorganic, porous, non-layered crystalline phase material, which exhibits after calcination and/or functionalization, an X-ray diffraction pattern with at least one peak at a d-spacing greater than about 18 Å Units with a relative intensity of 100 and having a benzene absorption capacity of greater than 15 grams per 100 grams anhydrous crystal at 50 torr and 25° C. was prepared according to methods discussed in U.S. Pat. Nos. 5,098,684 and 5,102,643. The material is a large pore crystalline phase material, which is thermally stable under a wide range of pH while exhibiting a high degree of uniformity in pore size. The pores are within the range of at least about 13 Å to about 200 Å with a pore volume of 0.6–1.3 cc/g. The material has very high mechanical strength over extended periods of time and can withstand elevated temperatures of up to about 700° C. This material is filled with homogeneous polymer gels. A monomer or a mixture of monomers to be polymerized is added in a concentration of 0.1–10 grams per gram of porous M41S material. Preferably the monomer volume is 5–100% by volume larger than the inside volume of the solid. The volatile solvent is removed in a vacuum of 0.1–300 mbars to the temperature of 0°–100° C. In order to apply lesser quantities of the monomer, the monomer is additionally diluted with less volatile and inert solvents such as toluene or xylene. Suitable monomers are all those proper for radical polymerization such as olefins, styrene derivatives, acrylic derivatives, methacrylate derivatives. A suitable initiator such as peroxides or azo compounds may also be added to the monomer mixture. Then the mixture is heated for 1–100 hours at 3°–120° C. To initiate the polymerization, other known methods may be employed, such as anionic, cationic, or coordinate polymerizations.

After polymerization, the chemically non-bound polymer is exhaustively rinsed with a suitable solvent and thereupon the mesoporous M41S material filled with the polymer is dried. In this way, a highly advantageous, hard material of smaller uniform pore size having high mechanical strength is provided. The foregoing material is packed into a gel chromatography column according to known procedures.

A sample containing polystyrene 111000, polystyrene 5000, tristearin, triacontane, eicosane, tetradecane, and octane at various flows is introduced at the head of the column and allowed to pass through it. As the molecules progress through the column of the invention, the small molecules of tristearin to octane enter the pores of the MCM-41 material, while the large molecules of polystyrene 111,000 and 5,000 continue to flow down the column. The samples emerge from the end of the column in reverse of molecular size, with the larger molecules eluting first. In this case the separation is as follows: polystyrene 111,000, polystyrene 5,000 followed by the remaining components tristearin, triacontane, eicosane, tetradecane, and octane.

EXAMPLE 11

A portion of five grams of MCM-41 is prepared by calcining synthesized MCM-41 at 500° C. The portion is dried overnight at 200° C. and then refluxed with 50 ml toluene, 5 ml gamma-glycidoxypropyltrimethoxysilane and 0.5 ml water. This material is dried at 70° C. in vacuum and then treated with 50 ml of a 10% solution of polyethyleneamine (MW=600) for 24 hours at room temperature. This material is dried under vacuum to make a polyamine functionalized MCM-41 which is further refluxed with 5 grams of propanesultone and 10 ml acetonitrile to make a propane sulfonated material. This material is packed into a chromatography column according to well known methods. A mixture of uracil, adenosine, and bovine insulin is injected in the column. The elutant is a dilute solution of ammonium phosphate buffer. The insulin elutes first because of size exclusion, followed by the uracil and then the adenosine. The latter two are separated on the basis of their polarity. This example illustrates the use of the functionalized MCM-41 material for chromatographic separation where the separation is achieved by size exclusion. In addition, some of the other components are also separated due to different polarity of the components. It has been found that if an amorphous silica gel column (such as Fisher S-679) is prepared as above, the insulin does not elute at all, because no size exclusion separation takes place and the insulin binds strongly to the polar surfaces of the silica gel.

EXAMPLE 12

In this example, 1.65 grams of $NaAlO_2$ was added to 80 grams of cetyltrimethylammonium hydroxide (CTMAOH) solution, prepared by contacting a 29 wt % N,N,N-trimethyl-1-hexadecanaminim chloride solution with a hydroxide-for-halide exchange resin. The mixture was stirred until the $NaAlO_2$ was completely dissolved. To this solution was added 40.0 grams of tetramethylammonium silicate solution (10 wt % $SiO_2$), 10.0 grams of HiSil (90 wt % $SiO_2$), and 6.01 grams of 1,3,5-trimethylbenzene. The resulting mixture was stirred at room temperature for several minutes. The gel was then loaded into a 300 ml autoclave and heated to 105° C. while stirring at 150 RPM. After about 4 hours of heating, the reaction was quenched with cold water, and the contents removed. The product was filtered and washed several times with warm (60°-70° C.) distilled water and with acetone. The final product was calcined at 538° C. in a $N_2$/air mixture for 8 hours. The gel reaction mixture had a composition in terms of moles per mole $Al_2O_3$ as follows:

1.25 moles $Na_2O$
27.8 moles $SiO_2$
5.1 moles $(CTMA)_2O$
2.24 moles $(TMA)_2O$
650 moles $H_2O$
6.91 moles 1,3,5-trimethylbenzene The calcined product of this example proved to have a surface area of 948.6 $m^2/g$ and a benzene adsorption capacity of 64.0 wt % at 25° C.

EXAMPLE 13

One gram of the product of Example 12 was mixed with one gram of tetraethylorthosilicate at room temperature for overnight. The mixture was then reacted with 5 grams of water for one hour. The product was calcined in nitrogen at 538° C. for one hour and then in air for 6 hours at 538° C. The benzene sorption at 25° C. was 40.9% wt %. Since the crystalline material had an initial benzene sorption of 64.0 wt % as shown in Example 12, the pore volume was reduced by 37% suggesting that the pore diameter was reduced by 8 Å. This product may be used as packing in column chromatography when it is desirable to separate components having molecules of relatively small size from larger molecules having a diameter larger than 8 Å.

EXAMPLE 14

The pore walls of the mesoporous crystalline material are functionalized for protein attachment by coupling through two oxygen atoms, one oxygen coupled to the pore walls and one oxygen coupled to the protein.

500 mg of mesoporous crystalline material MCM-41 or M41S is suspended in a solution of 2 mg/ml $NaBH_4$ in 1M NaOH. This suspension is incubated with 1-5 volumes of bis-epoxide (bis-oxiran, oxiran, butandiodiglycidyl ether) under vigorous shaking at 25° C. for about five hours. The bisepoxide phase disappears. The resulting oxiran activated MCM-41 or M41S is removed from suspension by centrifugation, washed thoroughly with water and again centrifuged.

The oxiran activated M41S or MCM-41 is resuspended in a solution of 2 mg/ml $NaBH_4$, 1M NaOH and incubated with ovalbumin protein overnight.

Excess oxiran groups in the suspension are then inactivated with an excess of ethylamine, and the suspension is subjected to successive washes as follows:
1. neutral wash—$H_2O$
2. high pH wash—0.1M potassium borate, pH 8.0
3. high salt—0.5M NaCl
4. low pH wash—0.1M potassium acetate, pH 4.0
5. high salt—0.5M NaCl
6. neutral wash—$H_2O$, pH 7.0

After the ovalbumin protein is coupled to the surface, it can be used for direct coupling to antibodies through the $NH_2$ groups present on the antibody.

Antibodies can also be coupled to the surface through the following groups: carbonyldiimidazole, cyanogen bromide, glutaraldehyde, hydroxysuccinimide and tosyl chloride which are first fastened to the pores walls by appropriate functionalization chemistry known in the art.

After the antibody is coupled to the surface of the protein bearing MCM-41 or M41S material, it can be used for coupling with its corresponding antigen.

EXAMPLE 15

Finely divided crystalline material obtained in accordance with any one of: the methods described in U.S. Pat. Nos. 5,098,684 and 5,102,643 is added dry or as a concentrated slurry to a solution or slurry of fibrous materials, for example, containing from 1-6 wt % of paper pulp. The crystalline material is intimately dispersed before a fibrous stock is formed, molded, sheeted, extruded, calendered, or cast in final form. For example, the M41S material can be added to the aqueous paper making pulp slurry at the wet end of the machine known as "beater addition." Addition of the crystalline material can be made to beaters, hydropulpers, jordans, fiberizing mills, as well as to stuff box, head box, etc. or other pulp refining and preparation devices. The M41S crystalline particles should be thoroughly distributed throughout the pulp while the latter is suspended in an aqueous medium. If the M41S particles are mixed with the pulp or paper making stock in a beater, then beating of the pulp must be continued while the particles are intimately distributed. On the other hand, if the M41S particles are added as a slurry in water, the particles should be distributed as uniform as possible throughout the pulp by using commercial methods of stirring, mixing, beating or dispersing.

After the particles are dispersed or distributed substantially uniform throughout the pulp or paper-making stock, the mass containing M41S particles is laid down, molded or shaped by conventional means.

The quantity of M41S particles which is incorporated in paper products can be varied widely depending on the size of the particles, the basis weight of the paper, the degree of the refinement of pulp, and the ultimate use of the product. Amounts of frown 5–300% by weight of M41S particles may be employed, with a preferred range from 25–200% so that the absorbing capacity of the paper is as high as possible. High weight rate ratios of M41S particles to dry pulp result in weaker paper products albeit having higher absorbing capacity.

Other modifying materials, commonly in amounts from 0.1–10 wt % may be added, such as conventional sizing agents, alum, natural or synthetic bonding agents and adhesives, loaders or fillers like carbonate, oxides, clays, dispersable carbon black, or dyes and pigments.

A filter paper containing M41S particles of 5 Å type is placed in a gaseous stream of hydrogen sulfide and gaseous molecules of larger molecular dimensions. The filter paper selectively absorbs in the pores the hydrogen sulfide, while permitting the passage through the sheet of the larger molecules. This provides an excellent method for cleaning gaseous streams of hydrogen sulfide and other small size molecules such as ammonia, carbon monoxide and carbon dioxide which are undesirable in a natural gas stream. The gaseous stream includes toluene, xylene and benzene, which being larger in molecular size are excluded by the paper pores. This is an example of using the M41S material as a composite membrane to provide a very effective size exclusion separation method.

EXAMPLE 16

A non-composite membrane is prepared by following the procedure outlined in U.S. Pat. Numbers 5,019,263, 5,069,794 and 5,100,596. Accordingly, a non-porous surface is contacted with a chemical mixture capable of forming the desired crystalline material under crystallization conditions as described in U.S. Pat. No. 5,098,684 and 5,102,643. After a period of time under suitable conditions, a cohesive membrane of crystallized material forms on the non-porous substrate surface. The thickness dimension of the membrane may vary from about 0.02 microns to about 1000 microns depending upon the length of time the surface is contacted with the chemical mixture and the amount of mixture provided. Other means such as varying the temperature or the ratio of crystallization mixture to forming surface area are also effective in adjusting the membrane thickness to a desired dimension.

The time of contacting of the surface with the reaction mixture may be from about 0.5 hrs. to about 72 hrs., preferably from about 1 hr. to about 10 hrs. and at a temperature ranging from about 25° C. to about 175° C., preferably from about 50° C. to about 150° C.

After the desired period of time, the substrate, now coated with crystalline material, is removed from contact with the chemical mixture, washed with distilled water and allowed to dry. The layer of crystalline material may be removed from the non-porous surface by various means depending upon the material chosen for the forming surface. The layer may be separated from polymeric surfaces, for example, by mechanical means such as careful scraping or peeling. Removal from metal surfaces may be accomplished with the use of solvents such as acetone, or by dissolving the metal with acid such as aqueous hydrochloric or nitric acid. With a support consisting of metal or metallized material such as aluminum or glass or teflon, treatment with an aqueous mineral acid can be employed.

The membrane material may also be calcined before or after removal from the substrate, for example, in an inert atmosphere or in air at a temperature ranging from about 150° C. to about 700° C. for about 0.5 hrs. to about 15 hrs.

EXAMPLE 17

A separation non-composite membrane is prepared in accordance with the procedure of Example 16. The non-composite membrane is geometrically arranged in any type of configuration which effects dialysis. A feedstream including plasma protein such as albumin and urea, uric acid and creatinine is fed through the non-composite membrane. A pressure differential is maintained across the membrane. The low molecular weight components, namely, urea, uric acid and creatinine diffuse easily through the membrane and exit as the permeate. The large protein molecules of albumin are collected as the retentate. This example illustrates the use of a non-composite membrane including the M41S material in a dialysis separation process.

EXAMPLE 18

A porous inorganic substrate, which may itself be a membrane, is contacted with M41S precursors as described in U.S. Pat. No. 5,098,684 and 5,102,643 in a chemical reaction mixture capable of forming M41S under crystallization conditions. After a period of time, under suitable conditions of pit and temperature, a thin M41S-type molecular sieve membrane is formed with a predetermined pore size of 20 Å, 40 Å, 60 Å, 80 Å or 100 Å etc.

As a result, the pore openings of at least one side of the starting substrate are reduced in size to those determined by the M41S molecular sieve. Thus, the resulting membrane has uniform pores of, for example, 20 Å, 40 Å, 60 Å, 80 Å, or 100 Å etc. The size of the pores of the M41S molecular sieve and the thickness of the membrane are controlled by synthesis conditions and the nature of the starting materials or precursors.

Substrates contemplated to be used include, as non-limiting examples, glass, mullite, zirconia, silica, alumina, spinels, carbides (such as those of silicon, boron, zirconium, hafnium, tantalum, vanadium, molybdenum, tungsten and niobium), membranes made from these materials, metallic membranes made of stainless steel, nickel, silver, gold, platinum or commercially available porous inorganic membranes sold under the trade names: HYTREX ®, UCARSEP ®, CARBOSEP ®, DYNACERAM ®, MEMBRALOX ®, CERAFLO ® and ANOPORE ®. The substrates have various configurations such as tube, disk, or monoliths of various shapes. Asymmetric composite membranes of up to four layers are not uncommon consisting of a thin membrane film with 20–100 Å pore diameter openings and, for example, three layers of support having monotonically increasing nominal pore diameters of, for example, 0.05, 0.5 and 5 microns.

A composite membrane so formed is used to separate plasma protein from urea, uric acid and creatinine. Alternatively, a composite membrane so formed is used to separate pyrogens or endotoxins from a pyrogen-containing liquid by way of ultrafiltration in a manner analogous to that of U.S. Pat. No. 5,104,546 which is incorporated herein by reference. Endotoxins are fever inducing substances which derive from gram negative bacteria and which have high molecular weights of about 10,000 up to 100,000 to 200,000 and even as high as one million. Although endotoxins can be removed by other separation methods, such as distillation or reverse osmosis, ultrafiltration is preferred because it is less expensive and more efficient. A mixture containing plasma protein, urea, uric acid and creatinine is passed through a membrane coated composite. A pressure differential is maintained across said membrane. A permeate solution consisting of urea, uric acid and creatinine exits the M41S membrane and leaves behind a retentate solution rich in plasma. Alternatively, a feedstream containing pyrogens and water is passed through a membrane coated composite. A pressure differential is maintained across said composite membrane. A permeate solution consisting of pyrogen-free water exits the M41S membrane and leaves behind a retentate stream which is highly concentrated in pyrogens. This example illustrates the use of a composite membrane including M41S material for ultrafiltration where separation is based on size exclusion.

EXAMPLE 19

A non-composite or composite M41S membrane of the types prepared in Examples 16 or 18 above is loaded with palladium or silver by currently available methods to yield a dense membrane. A membrane which is loaded with palladium is permeable to hydrogen gas. A membrane loaded with silver is permeable to oxygen gas. Consequently, a palladium loaded membrane may be used to separate hydrogen from, for example, alkanes, alkenes, naphthenes and aromatics or mixtures thereof or to remove trace quantities of hydrogen from a gas stream. This provides a highly cost effective method of separating hydrogen from higher molecular weight hydrocarbons present in, for example, refinery exhaust streams. A silver loaded membrane may be used to separate oxygen from air or to remove trace quantities of oxygen from a gas stream. Membranes produced in this fashion would be mechanically stronger than ultra or very thin films of metallic palladium or silver supported on grids whose maximum opening is greater than 100 Å and hence would be able to support very high pressure drops across them.

While there have been described herein what are presently believed to be the preferred embodiments of the present invention, those skilled in the art will realize that changes and modifications may be made thereto without departing from the spirit of the invention, and it is intended to claim all such changes and modifications as fall within the true scope of the invention.

We claim:

1. A method for separating substances comprising contacting a mixture of components having different sorption characteristics including at least a first and a second component in a flowable condition with an inorganic, porous, non-layered crystalline phase material consisting essentially of a material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C., said contact occurring for a sufficient time and under conditions suitable for inducing a retention of said first component within said material, whereby said first component is separated from said second component.

2. A method according to claim 1, further comprising providing said components in a gaseous form.

3. A method according to claim 1, further comprising providing said components in a gaseous carrier medium.

4. A method according to claim 1, further comprising providing said components in a liquid form.

5. A method according to claim 1, further comprising providing said components in a liquid carrier medium.

6. A method according to claim 1, further comprising providing the pores of said material with a specified size and shape so as to allow said first component of said mixture to pass into the pores for retention therein while excluding entry of said second component, whereby said first component becomes separated from said second component.

7. A method according to claim 6, further comprising providing said material in a gel matrix suitable for performing gel permeation chromatography.

8. A method according to claim 6, further comprising providing said material in a system selected from the group consisting of flat-bed, batch and column chromatography systems.

9. The method according to claim 1, wherein said crystalline phase material is in the form of a separation membrane.

10. The method according to claim 9, further comprising forming said material into a thin, cohesive continuous unsupported membrane under crystallization conditions by inducing crystallization of said material in a continuous layer upon a non-porous forming surface and removing the resulting crystallized layer in order to obtain a thin, non-composite membrane prior to contact with said feedstream mixture.

11. A method according to claim 9, further comprising depositing said material onto a porous, inorganic substrate in order to form a thin-layer composite membrane prior to contact with said feedstream mixture.

12. A method according to claim 9, further comprising providing said components in a gaseous form.

13. A method according to claim 9, further comprising providing said components in a gaseous carrier medium.

14. A method according to claim 9, further comprising providing said components in a liquid form.

15. A method according to claim 9, further comprising providing said components in a liquid carrier medium.

16. A method according to claim 10, wherein said non-composite membrane is loaded with a gas permeable metal.

17. The method according to claim 11, wherein said thin-layer membrane is loaded with a gas permeable metal.

18. A chromatographic substance for use in size exclusion-based separations, said substance comprising:
 a gel matrix; and
 an inorganic, porous, non-layered crystalline phase material, said material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C., wherein said material is disposed within said matrix.

19. A method for chromatographic separation comprising contacting a stationary phase with a fluid mobile phase and a mixture of at least a first component and a second component having different partition or retention characteristics with respect to said stationary phase, said stationary phase comprising an inorganic, porous, non-layered crystalline phase material consisting essentially of a material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C., said contacting occurring for a sufficient time and under conditions suitable for inducing a retention of said first component within said stationary phase, whereby said first component is separated from said second component.

20. The method of claim 19, wherein said partition or retention characteristics are caused by physical characteristics selected from the group consisting of molecular weight, molecular size, solubility, ion exchange and binding affinity.

21. A method for membrane separation comprising contacting a separation membrane including an inorganic, porous, non-layered crystalline phase material consisting essentially of a material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C., with a feedstream mixture of components having different permeability characteristics including at least a first component at a first concentration and a second component at a second concentration, said contacting occurring under separation conditions such that said separation membrane affords greater permeability to said first component through said membrane than said second component, thereby producing an effluent stream wherein the concentration of said second component has been substantially reduced.

22. A method according to claim 21, further comprising providing the pores of said material with a specified pore size and shape so as to allow said first component to enter the pores and permeate therethrough while restricting the passage of said second component therethrough.

23. A chromatographic system which comprises a stationary phase, a fluid mobile phase, and a mixture of at least a first and second component having different sorption characteristics with respect to said stationary phase, said stationary phase comprising an inorganic, porous, non-layered crystalline phase material, said material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C., said fluid mobile phase being in contact with said stationary phase for a sufficient time under conditions suitable for separating said first component from second component.

24. A chromatographic substance according to claim 23, wherein said material includes a separating agent supported upon its pore walls, said separating agent capable of a retentive association with at least one of a plurality of components present within a sample mixture to be separated.

25. A chromatographic system according to claim 24, wherein said separating agent is disposed upon the pore walls of said material by way of absorption.

26. A chromatographic system according to claim 25, wherein said material includes functional groups attached to the pore walls by way of a treatment comprising contacting said material with a treatment composition comprising $M'X'Y'_n$ wherein, M' is selected from a group consisting of Periodic Table Groups IIA, IIIA, IVA, VA, VIA, VIIIA, IB, IIB, IIIB, IVB, VB and VIB;

X' is selected from a group consisting of halides, hydrides, alkoxides of $C_{1-6}$, alkyls of $C_{1-18}$, alkenyls of $C_{1-18}$, aryls of $C_{1-18}$, aryloxides of $C_{1-18}$, sulfonates, nitrates, and acetates;

Y' is selected from a group consisting of X', amines, phosphines, sulfides, carbonyls and cyanos; and $n=1-5$; said contacting of said material with said treatment composition occurring under such conditions so that the pore walls of said crystalline phase material become functionalized.

27. A chromatographic system according to claim 26, wherein a specialized moiety is coupled to the functionalized pore walls to serve as said separating agent.

28. A chromatographic system according to claim 27, wherein said specialized moiety is an ion exchanging moiety.

29. A chromatographic system according to claim 27, wherein said specialized moiety is selected from the group consisting of peptides, peptide fragments and peptide conjugates.

30. A membrane system which comprises a separation membrane including an inorganic, porous, non-layered crystalline phase material, said material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 tort and 25° C., and a feedstream mixture of components having different permeability characteristics with respect to said separation membrane such that said membrane affords greater permeability to at least one component of said mixture.

31. A membrane system according to claim 30, wherein said material is present in a thin, cohesive, continuous, unsupported non-composite membrane.

32. A membrane system according to claim 30, wherein said material is deposited onto a porous, inorganic substrate to form a thin-layer composite membrane.

33. A membrane system according to claim 30, wherein said material further comprises pores of a predetermined size and shape so as to exclude passage of at least one component in a mixture.

34. A membrane system according to claim 30, wherein said material further comprises a separating agent disposed upon the pore walls of said material, said separating agent capable of a retentive association with at least one of a plurality of components present within a sample mixture to be separated.

35. A separation membrane according to claim 34, wherein said material includes functional groups attached to the pore walls by way of a treatment comprising:

contacting said material with a treatment composition comprising $M'X'Y'_n$ wherein, $M'$ is selected from a group consisting of Periodic Table Groups IIA, IIIA, IVA, VA, VIA, VIIIA, IB, IIB, IIIB, IVB, VB and VIB;

$X'$ is selected from a group consisting of halides, hydrides, alkoxides of $C_{1-6}$, alkyls of $C_{1-18}$, alkenyls of $C_{1-18}$, aryls of $C_{1-18}$, aryloxides of $C_{1-18}$, sulfonates, nitrates and acetates;

$Y'$ is selected from a group consisting of $X'$, amines, phosphines, sulfides, carbonyls and cyanos; and $n=1-5$; said contacting of said material with said treatment composition occurring under such conditions so that the pore walls of said crystalline phase material become functionalized.

36. A separation membrane according to claim 35, wherein a specialized moiety is coupled to the pore walls to serve as said separating agent.

37. A separation membrane according to claim 36, wherein said specialized moiety is an ion exchanging moiety.

38. A separation membrane according to claim 37, wherein said specialized moiety is selected from the group consisting of peptide fragments and peptide conjugates.

39. A separation membrane according to claim 31, wherein said non-composite membrane is loaded with a gas permeable metal.

40. A separation membrane according to claim 32, wherein said thin-layer membrane is loaded with a gas permeable metal.

41. A method for separating substances comprising contacting a mixture of components having different sorption characteristics including at least a first and a second component in a flowable condition with an inorganic, porous, non-layered crystalline phase material having a separating agent supported upon the pore walls of said material, said material exhibiting after calcination and/or functionalization, an X-ray diffraction pattern with at least one peak at a d-spacing greater than about 18 Å Units with a relative intensity of 100 and having a benzene adsorption capacity of greater than 15 grams per 100 grams anhydrous crystal at 50 torr and 25° C., said contact occurring for a sufficient time and under conditions suitable for inducing a retention of said first component within said material, whereby said mixture enters the pores and said first component becomes retained therein by way of a retentive association with said separating agent, thereby separating said first component from said second component.

42. A method according to claim 41, further comprising providing said separating agent upon the pore walls by way of adsorption.

43. A method according to claim 42, further comprising providing said material in a system selected from the group consisting of flat-bed, batch and column chromatography systems.

44. A method according to claim 42, further comprising providing said separating agent in a fluid condition, said fluid being adsorbed upon the pore walls.

45. The method according to claim 41, wherein said crystalline phase material having a separating agent supported upon the pore walls of said material is in the form of a separation membrane.

46. A method according to claim 45, further comprising selecting said moiety from the group consisting of ion exchanging moieties, whereby said first component is retained within said material via an ion exchange mechanism.

47. A method according to claim 45, further comprising selecting said moiety from the group consisting of, peptide fragments and peptide conjugates, whereby said first component is retained within said material via a binding affinity for said moiety.

48. A method for separating substances comprising contacting a mixture of components having different sorption characteristics including at least a first and a second component in a flowable condition with an inorganic, porous, non-layered crystalline phase material having a specialized moiety coupled to functionalized pore walls of said material, wherein prior to contact with said mixture said material has been treated by contacting said material with a treatment composition comprising $M'X'Y'_n$ wherein, $M'$ is selected from a group consisting of Period Table Groups IIA, IIIA, IVA, VA, VIA, VIIIA, IB, IIB, IIIB, IVB, VB, and VIB;

$X'$ is selected from a group consisting of halides, hydrides, alkoxides of $C_{1-6}$, alkyls of $C_{1-18}$, alkenyls of $C_{1-18}$, aryls of $C_{1-18}$, aryloxides of $C_{1-18}$, sulfonates, nitrates, and acetates;

$Y'$ is selected from a group consisting of $X'$, amines, phosphines, sulfides, carbonyls and cyanos; and $n=1-5$; said contacting of said material with said treatment composition occurring under such conditions so that the pore walls of said crystalline phase material become functionalized.

49. A method according to claim 48, further comprising selecting said moiety from the group consisting of ion exchanging moieties, whereby said first component is retained within said material via an ion exchange mechanism.

50. A method according to claim 49, further comprising providing said material in a system selected from the group consisting of flat-bed, batch and column chromatography systems.

51. A method according to claim 48, further comprising selecting said moiety from the group consisting of peptide fragments and peptide conjugates, whereby said first component is retained within said material via a binding affinity for said moiety.

52. A method according to claim 51, further comprising providing said material in a system selected from the group consisting of flat-bed, batch and column chromatography systems.

53. The method according to claim 48, wherein said crystalline phase material having a specialized moiety coupled to functionalized pore walls of said material is in the form of a separation membrane.

* * * * *